(12) United States Patent
Takatani et al.

(10) Patent No.: US 11,067,932 B2
(45) Date of Patent: Jul. 20, 2021

(54) INFORMATION PROCESSING APPARATUS CAPABLE OF APPROPRIATELY EXECUTING SHUTDOWN PROCESSING, METHOD OF CONTROLLING THE INFORMATION PROCESSING APPARATUS, AND STORAGE MEDIUM

(71) Applicant: CANON KABUSHIKI KAISHA, Tokyo (JP)

(72) Inventors: Tamotsu Takatani, Yokohama (JP); So Yokomizo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 220 days.

(21) Appl. No.: 16/133,829

(22) Filed: Sep. 18, 2018

(65) Prior Publication Data

US 2019/0018354 A1     Jan. 17, 2019

Related U.S. Application Data

(63) Continuation of application No. 13/328,421, filed on Dec. 16, 2011, now Pat. No. 10,120,316.

(30) Foreign Application Priority Data

Dec. 16, 2010   (JP) .................. 2010-280091
Dec. 24, 2010   (JP) .................. 2010-288047

(51) Int. Cl.
  *G03G 15/00*     (2006.01)
  *G06F 1/3206*    (2019.01)
  *G06F 11/14*     (2006.01)

(52) U.S. Cl.
  CPC ..... *G03G 15/5079* (2013.01); *G03G 15/5004* (2013.01); *G03G 15/55* (2013.01); *G06F 1/3206* (2013.01); *G06F 11/1417* (2013.01)

(58) Field of Classification Search
  CPC ... G03G 15/5079; G05G 15/55; G06F 1/3206
  (Continued)

(56) References Cited

U.S. PATENT DOCUMENTS 4,788,661 A   11/1988  Morita
6,081,752 A    6/2000  Benson, IV et al.
(Continued)

FOREIGN PATENT DOCUMENTS

CN   101211269 A   7/2008
CN   101339416 A   1/2009
(Continued)

OTHER PUBLICATIONS

Search Report issued in GB Appln. No. 1121525.8 dated Mar. 23, 2012.
(Continued)

*Primary Examiner* — Robert A Cassity
(74) *Attorney, Agent, or Firm* — Rossi, Kimms & McDowell LLP

(57) ABSTRACT

An information processing apparatus capable of recovering the apparatus from a state in which software operation is abnormal to a state in which the same is normal. The information processing apparatus is provided with a CPU for receiving an instruction for turning off power of the information processing apparatus. Upon receipt of the instruction, the CPU determines whether or not it is necessary to turn off the power of the information processing apparatus. When it is necessary to turn off the power of the information processing apparatus, the CPU controls the information processing apparatus such that the power thereof is turned off, whereas when it is unnecessary to turn off the power of the information processing apparatus, the CPU controls the information processing apparatus such that the power thereof is not turned off.

13 Claims, 10 Drawing Sheets

(58) Field of Classification Search
USPC .......................................................... 713/320
See application file for complete search history.

(56) References Cited

U.S. PATENT DOCUMENTS

| | | | |
|---|---|---|---|
| 6,895,515 | B1 | 5/2005 | Yamazaki |
| 8,351,813 | B2 | 1/2013 | Hashimoto |
| 8,775,845 | B2 | 7/2014 | Kimura et al. |
| 9,501,291 | B2 | 11/2016 | Yi et al. |
| 2003/0140261 | A1 | 7/2003 | Takasaki et al. |
| 2005/0066208 | A1 | 3/2005 | Koie et al. |
| 2005/0102540 | A1 | 5/2005 | Kim et al. |
| 2005/0108585 | A1* | 5/2005 | Yang .................. G06F 9/44521 713/310 |
| 2005/0262076 | A1 | 11/2005 | Voskuil |
| 2006/0047853 | A1 | 3/2006 | Igarashi et al. |
| 2006/0101292 | A1 | 5/2006 | Hahn et al. |
| 2006/0242646 | A1 | 10/2006 | Ookawa |
| 2007/0234079 | A1 | 10/2007 | Kimura et al. |
| 2009/0038009 | A1 | 2/2009 | Haishima |
| 2009/0313487 | A1* | 12/2009 | Lee ...................... G06F 1/3203 713/300 |
| 2010/0211743 | A1 | 8/2010 | Hara |
| 2011/0126036 | A1* | 5/2011 | Hayakawa ......... H04N 1/00896 713/323 |
| 2012/0124362 | A1 | 5/2012 | Deng et al. |
| 2012/0191990 | A1* | 7/2012 | Hodge .................. G06F 1/3203 713/300 |

FOREIGN PATENT DOCUMENTS

| | | |
|---|---|---|
| CN | 102144214 A | 8/2011 |
| DE | 4007845 A1 | 9/1991 |
| EP | 1755038 A1 | 2/2007 |
| EP | 2284706 A1 | 2/2011 |
| JP | H04153810 A | 5/1992 |
| JP | H11353059 A | 12/1999 |
| JP | 2005284491 A | 10/2005 |
| JP | 2006229509 A | 8/2006 |
| JP | 2007293806 A | 11/2007 |
| JP | 2010049590 A | 3/2010 |
| JP | 2010074380 A | 4/2010 |
| KR | 1020030072533 A | 9/2003 |
| KR | 1020050045026 A | 5/2005 |
| KR | 1020090131198 A | 12/2009 |
| WO | 2010027375 A1 | 3/2010 |

OTHER PUBLICATIONS

Office Action issued in German Appln. No. 102011088416.5 dated Aug. 1, 2013.
Report Concerning the Search of the State of the Art issued in NL Appln. No. 2007975 dated Jul. 26, 2013. English translation provided.
Office Action issued in Korean Appln. No. 10-2011-0135453 dated Apr. 28, 2014.
Office Action issued in Japanese Appln. No. 2010-280091 dated Jul. 22, 2014.
Office Action issued in Korean Appln. No. 10-2011-0135453 dated Nov. 27, 2014.
Official Action issued in Chinese Appln. No. 201110425383.3 dated Mar. 26, 2015. English translation provided.
Office Action issued in Chinese Appln. No. 201610753996.2 dated Apr. 26, 2018. English translation provided.
Office Action issued in U.S. Appl. No. 13/328,421 dated Sep. 16, 2013.
Office Action issued in U.S. Appl. No. 13/328,421 dated Mar. 10, 2014.
Office Action issued in U.S. Appl. No. 13/328,421 dated Jul. 31, 2014.
Office Action issued in U.S. Appl. No. 13/328,421 dated Feb. 26, 2015.
Office Action issued in U.S. Appl. No. 13/328,421 dated Aug. 14, 2015.
Office Action issued in U.S. Appl. No. 13/328,421 dated Feb. 12, 2016.
Office Action issued in U.S. Appl. No. 13/328,421 dated Aug. 16, 2016.
Office Action issued in U.S. Appl. No. 13/328,421 dated Mar. 1, 2017.
Office Action issued in U.S. Appl. No. 13/328,421 dated Jun. 30, 2017.
Office Action issued in U.S. Appl. No. 13/328,421 dated Jan. 9, 2018.
Notice of Allowance issued in U.S. Appl. No. 13/328,421 dated Jun. 18, 2018.

* cited by examiner

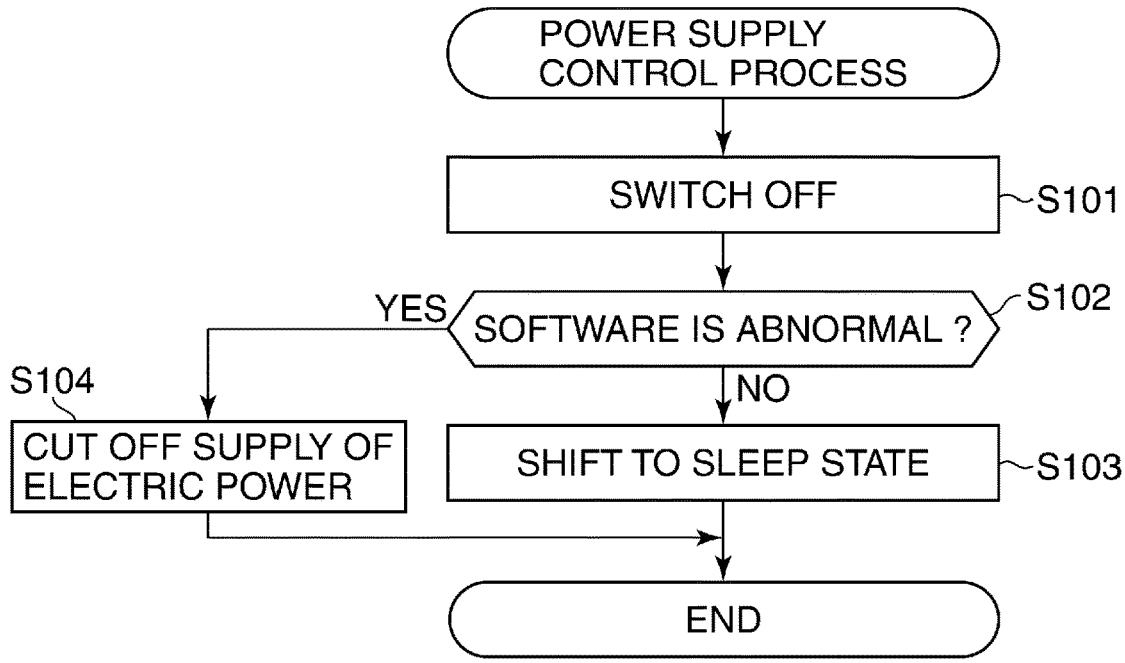
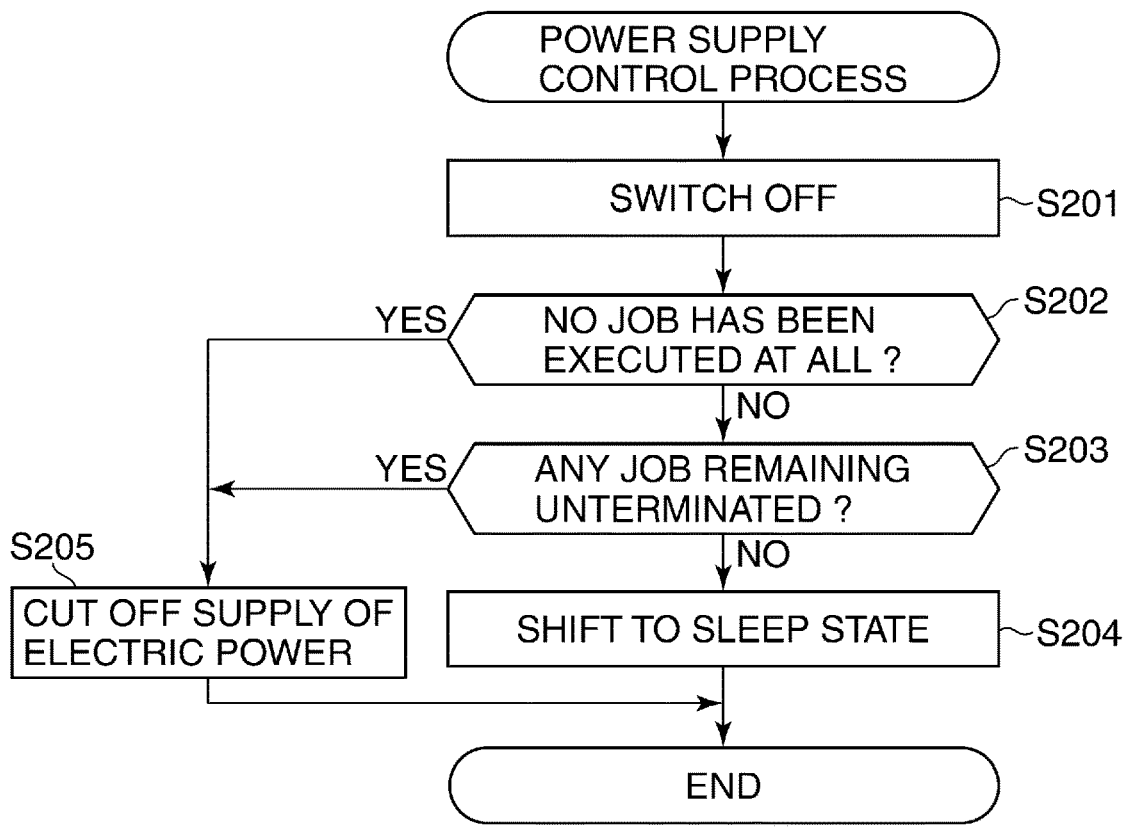

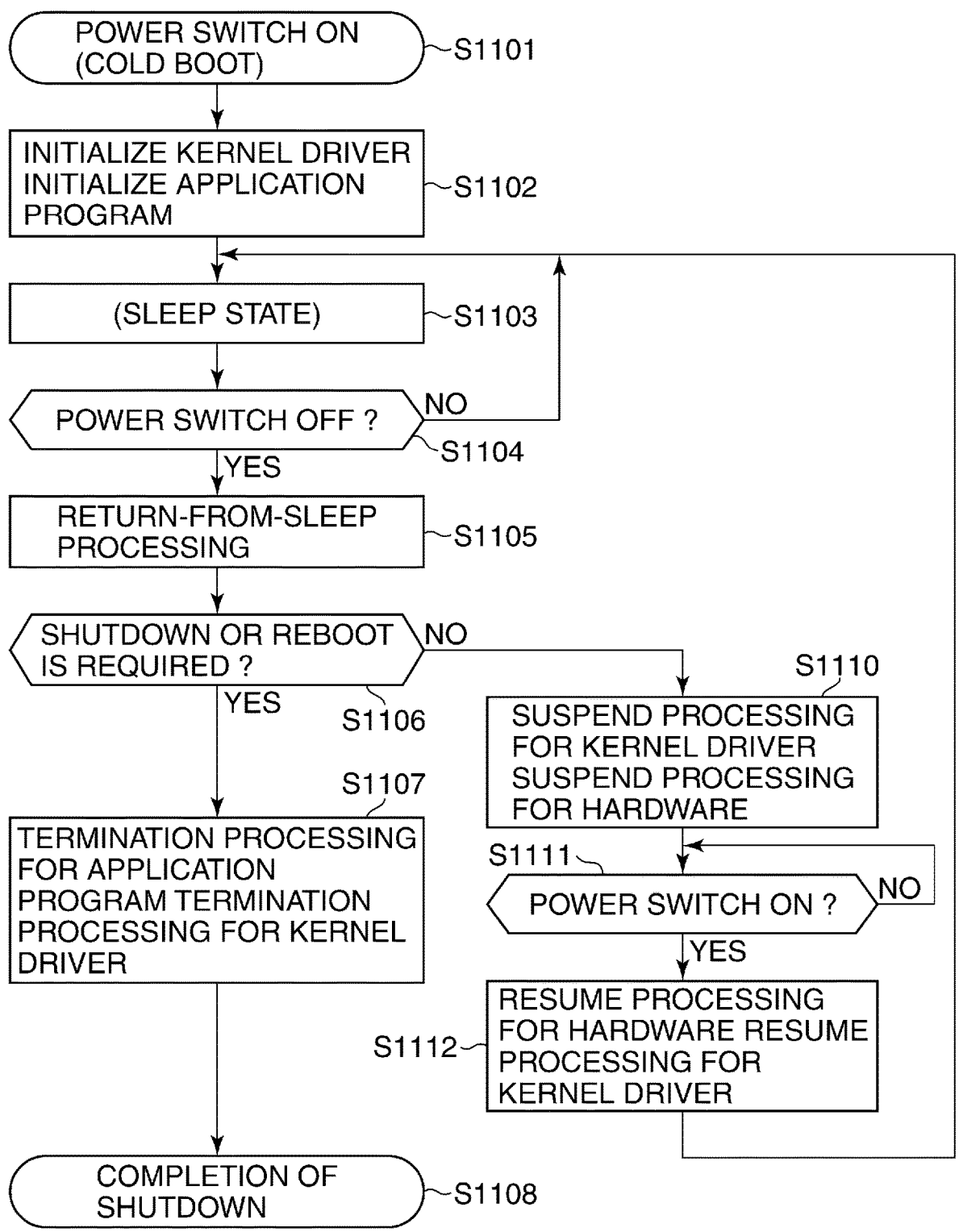

SHUTDOWN (RELEASE SWITCH OFF)

SUSPEND (RELEASE SWITCH ON)

INFORMATION PROCESSING APPARATUS CAPABLE OF APPROPRIATELY EXECUTING SHUTDOWN PROCESSING, METHOD OF CONTROLLING THE INFORMATION PROCESSING APPARATUS, AND STORAGE MEDIUM

BACKGROUND OF THE INVENTION

Field of the Invention

The present invention relates to an information processing apparatus, a method of controlling the same, and a storage medium, and more particularly to an information processing apparatus operated by software, a method of controlling the information processing apparatus, and a storage medium.

Description of the Related Art

Recently, an information processing apparatus realized as an image forming apparatus or the like has come to have more functions. Along with this, the information processing apparatus has become complicated in the system, and time taken to start up the software tends to be increased.

To solve the problems, a technique has been established in which when being switched off, the information processing apparatus is placed in a state (sleep state) where electric power is supplied only to a volatile memory (e.g. a DRAM) in which software is loaded, so that the information processing apparatus can be restarted from the state when the apparatus is switched on next time, to thereby reduce time required for the start-up of the software.

In relation to the above-mentioned technique, there has been disclosed a technique in which a time at which user operation is rarely performed is statistically determined during the sleep state, and the software is rebooted at the time (see e.g. Japanese Patent Laid-Open Publication No. 2006-229509).

However, if a software trouble (e.g. freeze or memory exhaustion) occurs before the information processing apparatus is switched off and brought into the state (sleep state) where only the volatile memory in which software is loaded is supplied with electric power, the operation of switching off and then switching on (rebooting) the information processing apparatus only returns the apparatus to the same troubled state.

As described above, it is difficult for the conventional technique of rebooting software during the sleep mode to recover the apparatus from a state in which software operation is abnormal to a state in which the software operation is normal.

Further, boot time in a recent information processing system tends to increase due to an increase in the number of programs. In order to achieve quick start of such a system, a technique of using a suspend/resume (or hibernation) function has been proposed.

Japanese Patent Laid-Open Publication No. 2005-284491 proposed a technique in which a memory image of each program formed at completion of the start of the system is made ready for use in advance, and is loaded when recovering from the sleep state, whereby time taken from the start to completion of the boot of an application is reduced.

In general, a user is not aware of difference in processing between a start involving initialization of the entire information processing system and a start performed using the resume function, and when the user turns on a power button, one of the two start processes is performed according to a boot setting.

On the other hand, when the user desires to terminate the information processing system, he/she needs to select between shutdown processing and suspend processing according to the situation.

Further, if a change in settings which requires a system reboot is performed in a normal state of the information processing system, the user needs to judge that the change in settings requires a system reboot and execute shutdown processing irrespective of the boot setting.

However, it is very difficult for an ordinary user to perform the above-mentioned judgment. For this reason, even though a change in settings has been performed which requires shutdown, shutdown may not be executed, making it impossible to properly reflect the change in the settings, or shutdown may be performed though unnecessary, making time taken to boot next time unnecessarily longer.

SUMMARY OF THE INVENTION

The present invention provides an information processing apparatus capable of recovering the information processing apparatus from a state in which a software operation is abnormal to a state in which the same is normal, a method of controlling the information processing apparatus, and a storage medium storing a computer-readable program implementing the method.

Further, the present invention provides an information processing apparatus which is capable of selectively using a suspend (or hibernation) function and a shutdown function in an appropriate manner without making a user aware of it, to thereby realize an information processing environment where appropriate initialization, quick start, and excellent usability of the apparatus are achieved.

In a first aspect of the present invention, there is provided an information processing apparatus comprising a receiving unit configured to receive an instruction for turning off power of the information processing apparatus, a determination unit configured to be operable when said receiving unit has received the instruction, to determine whether or not it is necessary to turn off the power of the information processing apparatus, and a control unit configured to be operable when said determination unit has determined that it is necessary to turn off the power of the information processing apparatus, to control the information processing apparatus such that the power thereof is turned off, and when said determination unit has determined that it is unnecessary to turn off the power of the information processing apparatus, to control the information processing apparatus such that the power thereof is not turned off.

In a second aspect of the present invention, there is provided a method of controlling an information processing apparatus comprising receiving an instruction for turning off power of the information processing apparatus, determining, when said receiving unit has received the instruction, whether or not it is necessary to turn off the power of the information processing apparatus, and controlling, when it is determined that it is necessary to turn off the power of the information processing apparatus, the information processing apparatus such that the power thereof is turned off, and controlling, when it is determined that it is unnecessary to turn off the power of the information processing apparatus, the information processing apparatus such that the power thereof is not turned off.

In a third aspect of the present invention, there is provided a non-transitory computer-readable storage medium storing a computer-executable program for causing a computer to execute a method of controlling an information processing apparatus, wherein the method comprises receiving an instruction for turning off power of the information processing apparatus, determining, when said receiving unit has received the instruction, whether or not it is necessary to turn off the power of the information processing apparatus, and controlling, when it is determined that it is necessary to turn off the power of the information processing apparatus, the information processing apparatus such that the power thereof is turned off, and controlling, when it is determined that it is unnecessary to turn off the power of the information processing apparatus, the information processing apparatus such that the power thereof is not turned off.

According to the present invention, it is possible to recover the information processing system from the state in which a software operation is abnormal to the state in which the same is normal. Further, it is possible to selectively use a suspend (or hibernation) function and a shutdown function in an appropriate manner without making a user aware of it, to thereby realize an information processing environment where appropriate initialization, quick start, and excellent usability of the apparatus are achieved.

Further features of the present invention will become apparent from the following description of exemplary embodiments with reference to the attached drawings.

BRIEF DESCRIPTION OF THE DRAWINGS

FIG. 2 is a flowchart of a power supply control process executed by the image forming apparatus in FIG. 1.

FIG. 3 is a flowchart of a first variation of the power supply control process executed by the image forming apparatus in FIG. 1.

FIG. 11 is a flowchart of a second shift process in which the information processing system in the present embodiment shifts from a sleep state to the suspend state.

DESCRIPTION OF THE EMBODIMENTS

The present invention will now be described in detail below with reference to the accompanying drawings showing embodiments thereof.

Figure 1:
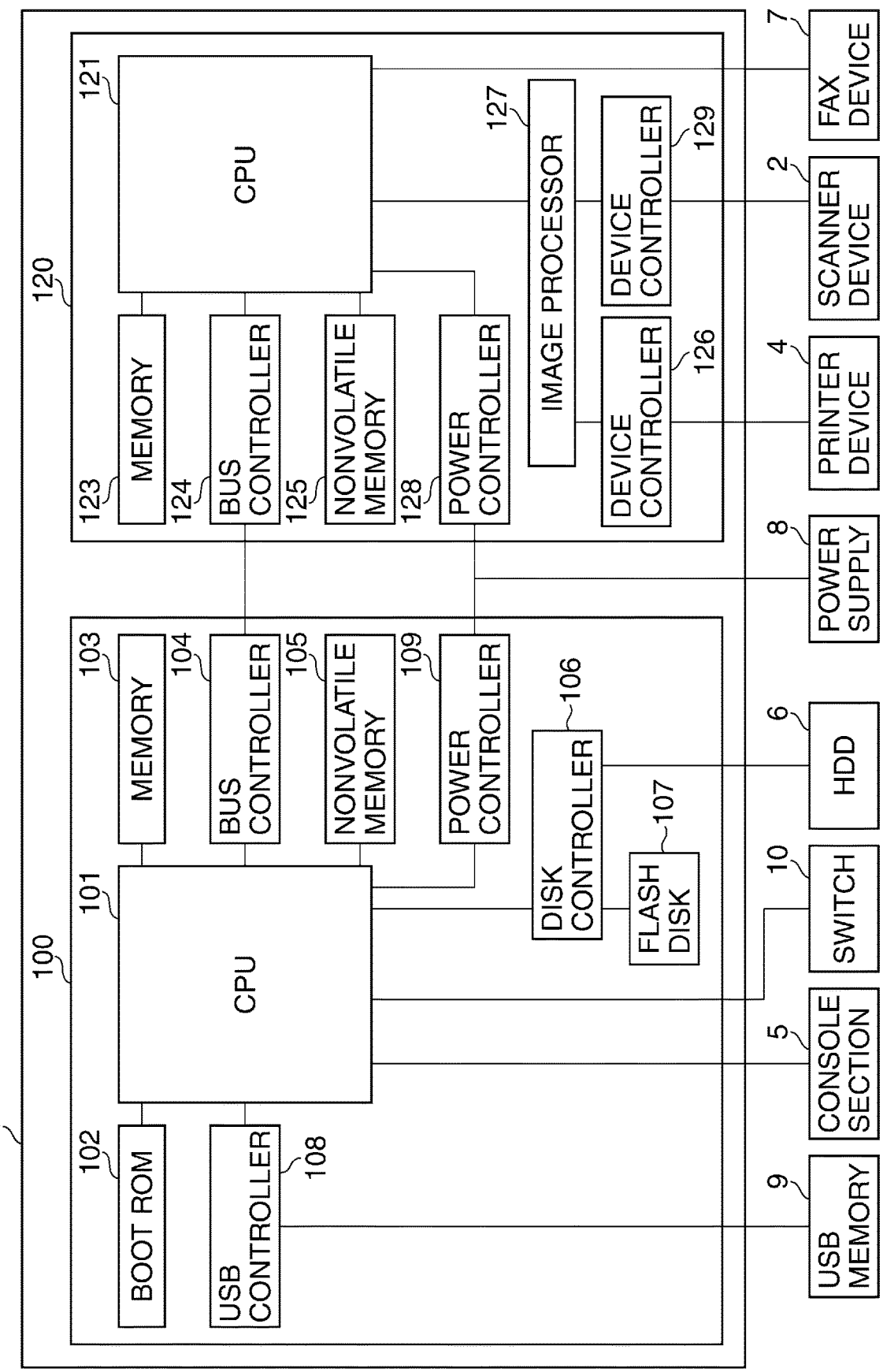
FIG. 1 is a schematic diagram of an image forming apparatus as an information processing apparatus according to a first embodiment of the present invention.

FIG. 1 is a schematic diagram of an image forming apparatus 200 as an information processing apparatus according to a first embodiment of the present invention.

Referring to FIG. 1, the image forming apparatus 200 comprises a controller 1 (control unit), a USB memory 9, a console section 5, a switch 10, a HDD 6, a power supply 8, a printer device 4, a scanner device 2, and a FAX device 7.

The controller 1 comprises a main board 100 and a sub board 120.

The main board 100 is a so-called general-purpose CPU system. The main board 100 comprises a CPU 101, a boot ROM 102, a USB controller 108, a memory 103, a bus controller 104, a nonvolatile memory 105, a power controller 109, a disk controller 106, and a flash disk 107.

The CPU 101 controls the overall operation of the main board 100. The boot ROM 102 stores a boot program. The memory 103 is a nonvolatile memory, and the CPU 101 uses the same as a work memory. Usually, software is stored in the nonvolatile memory 105, and temporary data or the like for use in operating the software is loaded into the memory 103. In addition to the data, software generated from the software stored in the nonvolatile memory 105 is sometimes loaded into the memory 103. The controller 1 controls the image forming apparatus 200 according to the software programs. However, when a trouble occurs in information contained e.g. in data or software stored in the memory 103, the operating state of the software becomes abnormal. In this case, even when another device (e.g. the printer device 4) is rebooted by supplying electric power to the memory 103, an unstable state of the software is inevitably continued. Therefore, the supply of electric power to the memory 103 is cut off by cutting off the supply of electric power to the controller 1, whereby it is possible to restore the image forming apparatus 200 from a state in which the operation of the software is abnormal to a state in which the same is normal.

The bus controller 104 has a function of acting as a bridge to an external bus. The nonvolatile memory 105 is capable of storing information even after the supply of electric power is cut off. The disk controller 106 controls a storage device (the flash disk 107 in the illustrated example) connected thereto. The flash disk (e.g. an SSD (solid state drive)) 107 is a relatively small-capacity storage device formed by a semiconductor device. The USB controller 108 is capable of controlling a USB device (the USB memory 9 in the illustrated example) connected thereto. The power controller 109 manages the supply of electric power to each section of the main board 100, which needs electric power.

The USB memory 9, the console section 5, the HDD 6, and the switch 10, mentioned above, are externally connected to the main board 100. The HDD 6 may be any type insofar as it is a nonvolatile device. The console section 5 comprises various kinds of buttons for user operation and a touch panel for displaying information to a user and for user operation. When the switch 10 is operated by the user, it sends an interrupt to the CPU 101. When detecting the interrupt, the CPU 101 controls the power controller 109 according to a state of the image forming apparatus 200. Thus, the user turns on or off the main power supply, but even when the main power supply of the image forming apparatus 200 is turned off, the supply of electric power is not completely cut off.

The sub board 120 comprises a relatively small general-purpose CPU system and image processing hardware.

The sub board 120 comprises a CPU 121, a memory 123, a bus controller 124, a nonvolatile memory 125, a power controller 128, an image processor 127, and device controllers 126 and 129.

The CPU 121 controls the overall operation of the sub board 120. The memory 123 is used as a work memory by the CPU 121. The bus controller 124 has a function of acting as a bridge to an external bus. The nonvolatile memory 125 is capable of storing information even after the supply of electric power is cut off.

The image processor 127 performs real-time digital image processing. The device controller 126 passes data between the printer device 4 and the image processor 127, and the device controller 129 passes data between the scanner device 2 and the image processor 127. The CPU 121 directly controls the FAX device 7.

The power controller 128 manages the supply of electric power to each section of the sub board 120, which needs electric power.

The main board 100 and the sub board 120 are supplied with electric power from the power supply 8. The switch 10 is used by the user for power on/off operation. When the switch 10 is operated, an interrupt is sent to the CPU 101, as described hereinbefore. When detecting the interrupt, the CPU 101 controls the power controllers 109 and 128 according to a state of the image forming apparatus 200.

Note that FIG. 1 shows the image forming apparatus 200 in a simplified manner for simplicity of explanation. For example, each of the CPU 101 and the CPU 121 includes lots of CPU peripheral hardware devices, such as chip sets, bus bridges, and clock generators, but these are omitted in FIG. 1 because they are unnecessary for description of the present embodiment. Therefore, the present invention is not limited to the configuration shown in the block diagram.

The operation of the controller 1 configured as above will be described by taking image copying as an example.

When the user gives an instruction for image copying via the console section 5, the CPU 101 sends an image read command to the scanner device 2 via the CPU 121. The scanner device 2 optically scans a sheet original, converts an image into digital image data, and inputs the digital image data to the image processor 127 via the device controller 129. The image processor 127 DMA-transfers the digital image data to the memory 123 via the CPU 121, and the memory 123 temporarily stores the digital image data.

After it can be confirmed that all or a predetermined amount of the digital image data has been input to the memory 123, the CPU 101 gives an image output instruction to the printer device 4 via the CPU 121. The CPU 121 notifies the image processor 127 of the location of the image data in the memory 123. The digital image data in the memory 123 is sent to the printer device 4 via the image processor 127 and the device controller 126 according to a synchronization signal from the printer device 4, and is then printed on a sheet in the printer device 4.

In the case of printing a plurality of copies, the CPU 101 stores the image data in the HDD 6, so that the image data can be sent to the printer device 4 for printing of a second and following copies without receiving the image data from the scanner device 2.

FIG. 2 is a flowchart of a power supply control process executed by the image forming apparatus 200 in FIG. 1.

The process in FIG. 2 is executed by the CPU 101 of the image forming apparatus 200 in FIG. 1.

Referring to FIG. 2, when the switch 10 is turned off by a user operation (step S101), the software detects an interrupt through the power controllers 109 and 128. Then, it is determined whether or not the operating state of the software having received the interrupt has become abnormal (step S102). If the operating state of the software has not become abnormal (NO to the step S102), the CPU 101 shifts the controller 1 to a sleep state (power saving state) via the power controllers 109 and 128 (step S103), followed by terminating the present process.

If it is determined in the step S102 that the operating state of the software has become abnormal (YES to the step S102), the CPU 101 cuts off the supply of electric power to the controller 1 via the power controllers 109 and 128 (step S104), followed by terminating the present process.

The sleep state (power saving state) means in its general sense a state in which the supply of electric power is cut off except to the controller 1, but in the present embodiment, as to the supply of electric power to the controller 1, it is only required that at least the supply of electric power to the memory 103 is not cut off.

According to the FIG. 2 process, when the switch 10 is turned off, it is determined whether or not the operating state of the software has become abnormal (step S102), and when it is determined that the operating state of the software has become abnormal (YES to the step S102), the supply of electric power to the controller 1 is cut off. Therefore, it is possible to recover the image forming apparatus 200 from a state in which a software operation is abnormal to a state in which the same is normal.

FIG. 3 is a flowchart of a first variation of the power supply control process executed by the image forming apparatus 200 in FIG. 1.

In the process in FIG. 3, a job is a predetermined process. For example, a printing process or the like process can be mentioned as the job, but basically, any process executed when the image forming apparatus is not idle can be mentioned as the job.

Referring to FIG. 3, when the switch 10 is turned off by a user operation (step S201), the software detects an interrupt through the power controllers 109 and 128. Then, it is determined whether or not no job has been executed at all after the switch 10 was turned on (step S202). If no job has been executed at all (YES to the step S202), the CPU 101 turns off the power of the controller 1 via the power controllers 109 and 128 (step S205), followed by terminating the present process.

If it is determined in the step S202 that any job has been executed at least once (NO to the step S202), it is determined whether or not any job remains unterminated (step S203). If there is any job remaining unterminated (YES to the step S203), the process proceeds to the step S205, whereas if not (NO to the step S203), the CPU 101 shifts the controller 1 to the sleep state (power saving state) via the power controllers 109 and 128 (step S204), followed by terminating the present process.

In the above-described process, determination is performed in respect of two points, i.e. whether no job has been executed at all and whether or not there is any job remaining unterminated. When no job has been executed at all, it can be presumed that some trouble occurred during the start of the apparatus or during an idle time. On the other hand, when there is any job remaining unterminated, it can be presumed that some trouble occurred during execution of the job.

Figure 4:
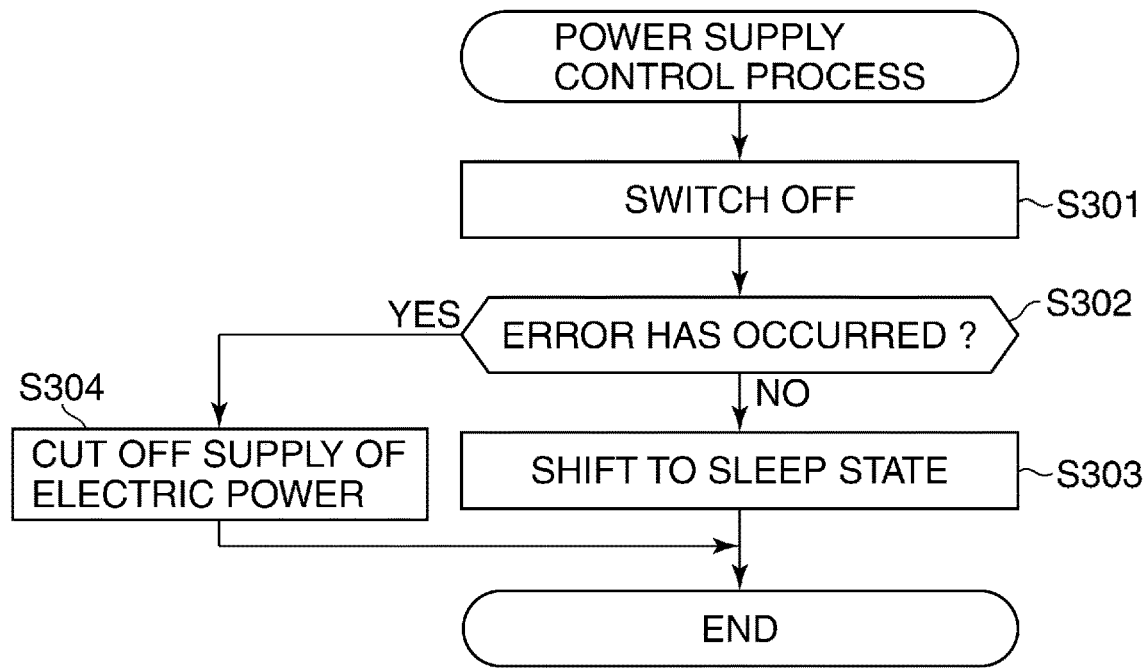
FIG. 4 is a flowchart of a second variation of the power supply control process executed by the image forming apparatus in FIG. 1.

FIG. 4 is a flowchart of a second variation of the power supply control process executed by the image forming apparatus 200 in FIG. 1.

Referring to FIG. 4, when the switch 10 is turned off by a user operation (step S301), the software detects an interrupt through the power controllers 109 and 128. Then, it is determined whether or not an error has occurred in software, from which the image forming apparatus 200 can be recovered only by turning off and on the power, i.e. by cutting off the supply of electric power (step S302). If no error has occurred (NO to the step S302), the CPU 101 shifts the controller 1 to the sleep state (power saving state) via the power controllers 109 and 128 (step S303), followed by terminating the present process.

If it is determined in the step S302 that an error has occurred in software, from which the image forming apparatus 200 can be recovered only by turning off and on the power, (YES to the step S302), the CPU 101 turns off the power of the controller 1 via the power controllers 109 and 128 (step S304), followed by terminating the present process.

Figure 5:
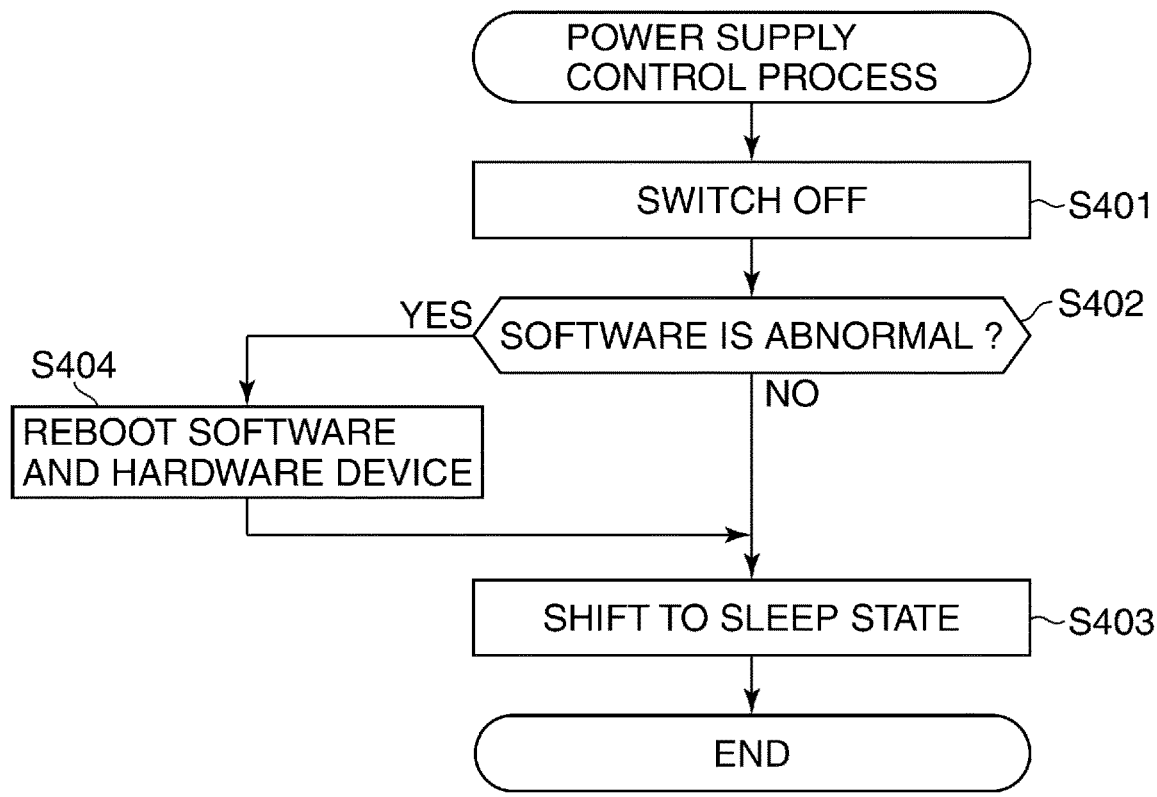
FIG. 5 is a flowchart of a third variation of the power supply control process executed by the image forming apparatus in FIG. 1.

FIG. 5 is a flowchart of a third variation of the power supply control process executed by the image forming apparatus 200 in FIG. 1.

Referring to FIG. 5, when the switch 10 is turned off by a user operation (step S401), software detects an interrupt through the power controllers 109 and 128. Then, it is determined whether or not the software having received the interrupt is in an abnormal state (step S402). If the software is not in an abnormal state (NO to the step S402), the CPU 101 shifts the controller 1 to the sleep state (power saving state) via the power controllers 109 and 128 (step S403), followed by terminating the present process.

If it is determined in the step S402 that the software is in an abnormal state (YES to the step S402), the CPU 101 reboots the software, and at the same time reboots a hardware device required to be initialized along with rebooting of the software, through the power controllers 109 and 128 (step S404). Then, the CPU 101 shifts the controller 1 to the sleep state via the power controllers 109 and 128 (step S403), followed by terminating the present process.

Compared with the power supply control process in FIG. 2, the third variation described above tends to take a longer time from when the switch 10 is turned off in shifting to a low power state, since rebooting of the software and associated hardware device is performed, but it is faster in recovery when the switch 10 is turned on next time. The processing in FIG. 5 in which after rebooting (step S404), the controller 1 is shifted to the sleep state (step 403) can also be applied to the power supply control processes in FIGS. 3 and 4.

Figure 6:
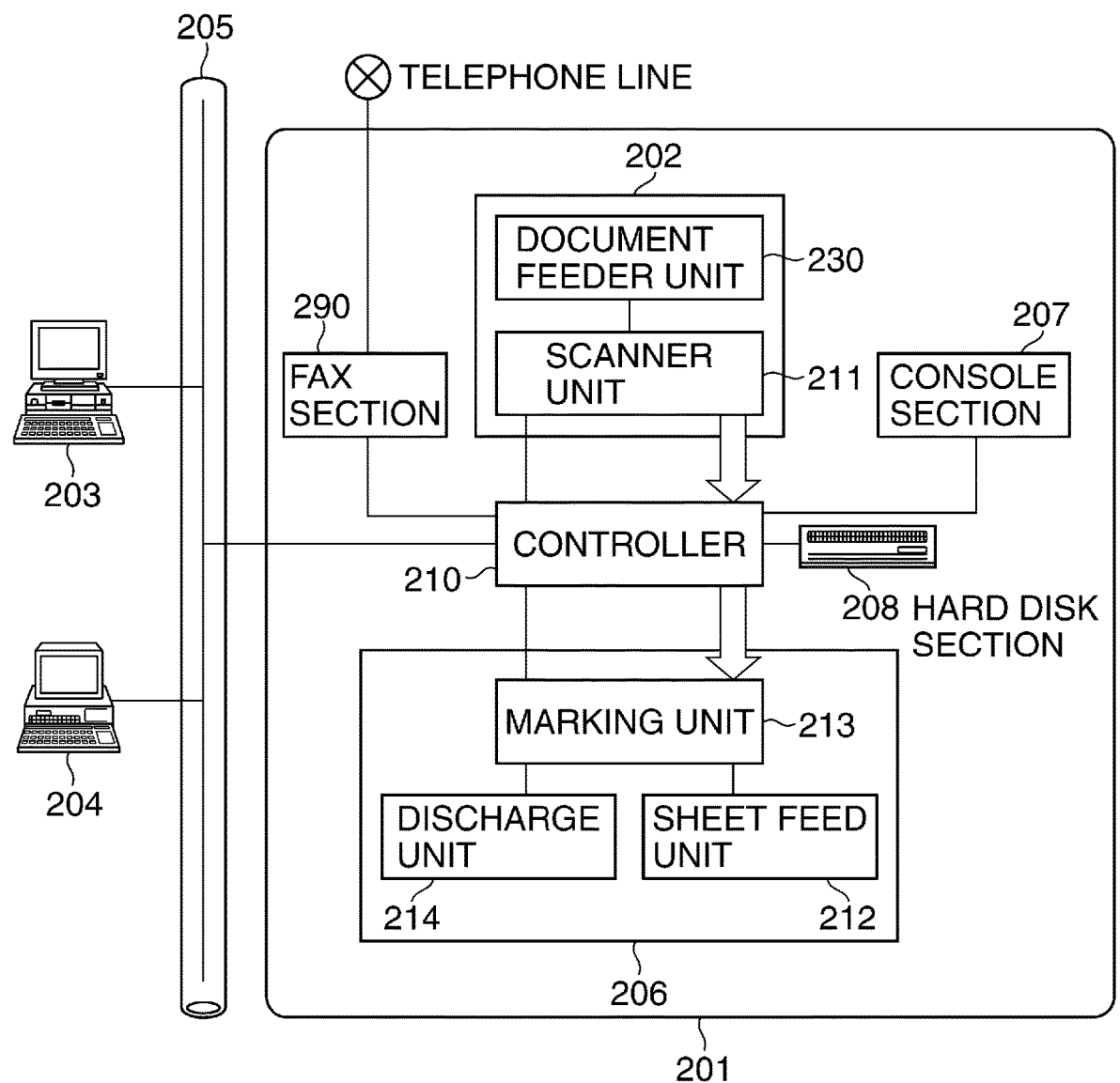
FIG. 6 is a block diagram of an information processing system incorporating a controller to which an information processing apparatus according to a second embodiment of the present invention is applied.

FIG. 6 is a block diagram of an information processing system incorporating a controller to which an information processing apparatus according to a second embodiment of the present invention is applied. Referring to FIG. 6, a reference numeral 201 denotes the information processing system (image input/output system) to which the information processing apparatus according to the second embodiment is applied. The information processing system 201 is connected to host computers (a first host computer 203 and a second host computer 204 in the present embodiment) by a LAN (local area network) 205 implemented e.g. by an Ethernet (registered trademark).

The information processing system 201 comprises a reader section 202, a printer section 206, a console section 207, a hard disk section 208, a FAX section 290, and a controller 210.

The reader section 202 reads image data. The printer section 206 outputs image data. The console section 207 comprises a keyboard for inputting/outputting image data, various hard keys including a power switch, and a liquid crystal panel for displaying image data, various functions, and so forth. Control programs, image data, etc. are written (recorded in a computer-readable manner) in the hard disk section 208 in advance. The FAX section 290 performs facsimile transmission and reception.

The controller 210 is connected to the reader section 202, the printer section 206, the console section 207, the hard disk section 208, the FAX section 290, and like other component elements, so as to control them.

The reader section 202 comprises a document feeder unit 230 for conveying an original sheet, and a scanner unit 211 for optically reading an original image and converting the original image to image data as an electric signal.

The printer section 206 comprises a sheet feed unit 212 having a plurality of sheet feed cassettes each containing recording sheets, a marking unit 213 for transferring image data onto a recording sheet and fixing the transferred image data on the same, and a discharge unit 214 for sorting and stapling printed recording sheets and discharging these from the apparatus.

Figure 7:
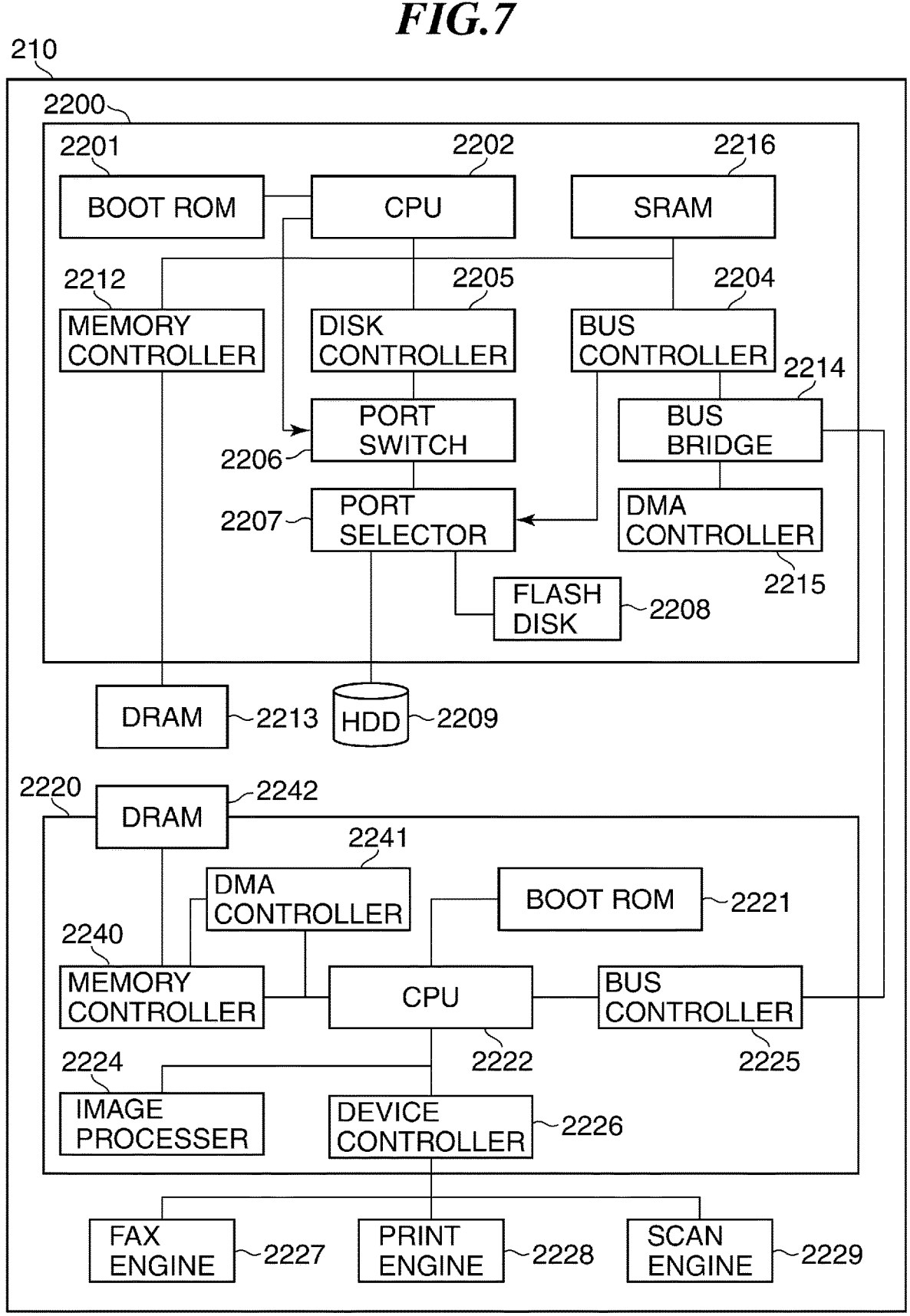
FIG. 7 is a block diagram of the controller.

FIG. 7 is a block diagram of the controller 210. As shown in FIG. 7, the controller 210 is roughly divided into a main CPU unit 2200 (main board) that controls general information processing operation and a sub CPU unit 2220 (sub board) that controls image forming operation.

It is to be understood that the main CPU unit 2200 and the sub CPU unit 2220 can also be formed as a single board. However, in the present embodiment, the following description will be given, for simplicity of explanation, by taking as an example a case where the controller 210 comprises the two separate boards, i.e. the main CPU unit 2200 and the sub CPU unit 2220.

On the main CPU unit 2200, there are mounted a boot ROM 2201, a CPU 2202, volatile memories (DRAM 2213 and SRAM 2216), and a memory controller 2212.

The boot ROM 2201 is a nonvolatile memory storing a boot program. The CPU 2202 is an arithmetic processing device for executing the boot program and other programs. The DRAM 2213 is a nonvolatile memory for temporarily storing programs and data. The memory controller 2212 controls the DRAM 2213.

Further, on the main CPU unit 2200, there are mounted a bus controller 2204 for controlling connection to the sub CPU unit 2220, a disk controller 2205 for controlling a hard disk drive (HDD) 2209, and so forth. Note that the hard disk drive 2209 is housed in the hard disk section 208 appearing in FIG. 6.

The disk controller 2205 is connected to a port selector 2207 via a port switch 2206 for switching between permission and inhibition of access to a connected device.

A flash disk 2208 and the hard disk drive 2209 are connected to the port selector 2207, such that the flash disk 2208 or the hard disk drive 2209 selected by the port selector 2207 can be controlled by the disk controller 2205.

Although in the present embodiment, the disk controller 2205, the port switch 2206, and the port selector 2207 are described as separate modules, it is possible to mount a part or all of these as a single module.

The flash disk 2208 or the hard disk drive 2209 stores various programs including an OS (operating system) and application programs.

Further, on the main CPU unit 2200, there is mounted a bus bridge 2214 for bus-connection between the main CPU unit 2200 and the sub CPU unit 2220. Furthermore, on the main CPU unit 2200, there is mounted a DMA controller 2215 for transferring memory data between the main CPU unit 2200 and the sub CPU unit 2220.

On the other hand, on the sub CPU unit 2220, there are mounted a boot ROM 2221, a CPU 2222, a volatile memory (DRAM) 2242, and a memory controller 2240.

The boot ROM 2221 is a nonvolatile memory storing a boot program. The CPU 2222 is an arithmetic processing device for executing the boot program and other programs. The volatile memory 2242 temporarily stores programs and data. The memory controller 2240 controls the volatile memory 2242.

Further, on the sub CPU unit 2220, there is mounted a bus controller 2225. Furthermore, on the sub CPU unit 2220, there are mounted an image processor 2224 and a device controller 2226.

The bus controller 2225 controls connection to the main CPU unit 2200. The image processor 2224 executes an image forming process at high speed. The device controller 2226 controls image forming devices, such as a FAX engine 2227, a print engine 2228, and a scan engine 2229, connected thereto, and executes an image forming process. Note that the FAX engine 2227, the print engine 2228, and the scan engine 2229 are housed in the FAX section 290, the printer section 206, and the reader section 202, each appearing in FIG. 6, respectively.

Further, on the sub CPU unit 2220, there is mounted a DMA controller 2241 for transferring memory data between the main CPU unit 2200 and the sub CPU unit 2220.

The controller 210 has a network interface, not shown. A network driver for controlling the network interface is stored in the flash disk 2208, the hard disk drive 2209, the boot ROM 2221, or the like. Module drivers for controlling various modules including the FAX engine 2227, the print engine 2228, and the scan engine 2229 are also stored in the flash disk 2208, the hard disk drive 2209, the boot ROM 2221, or the like.

Figure 8:
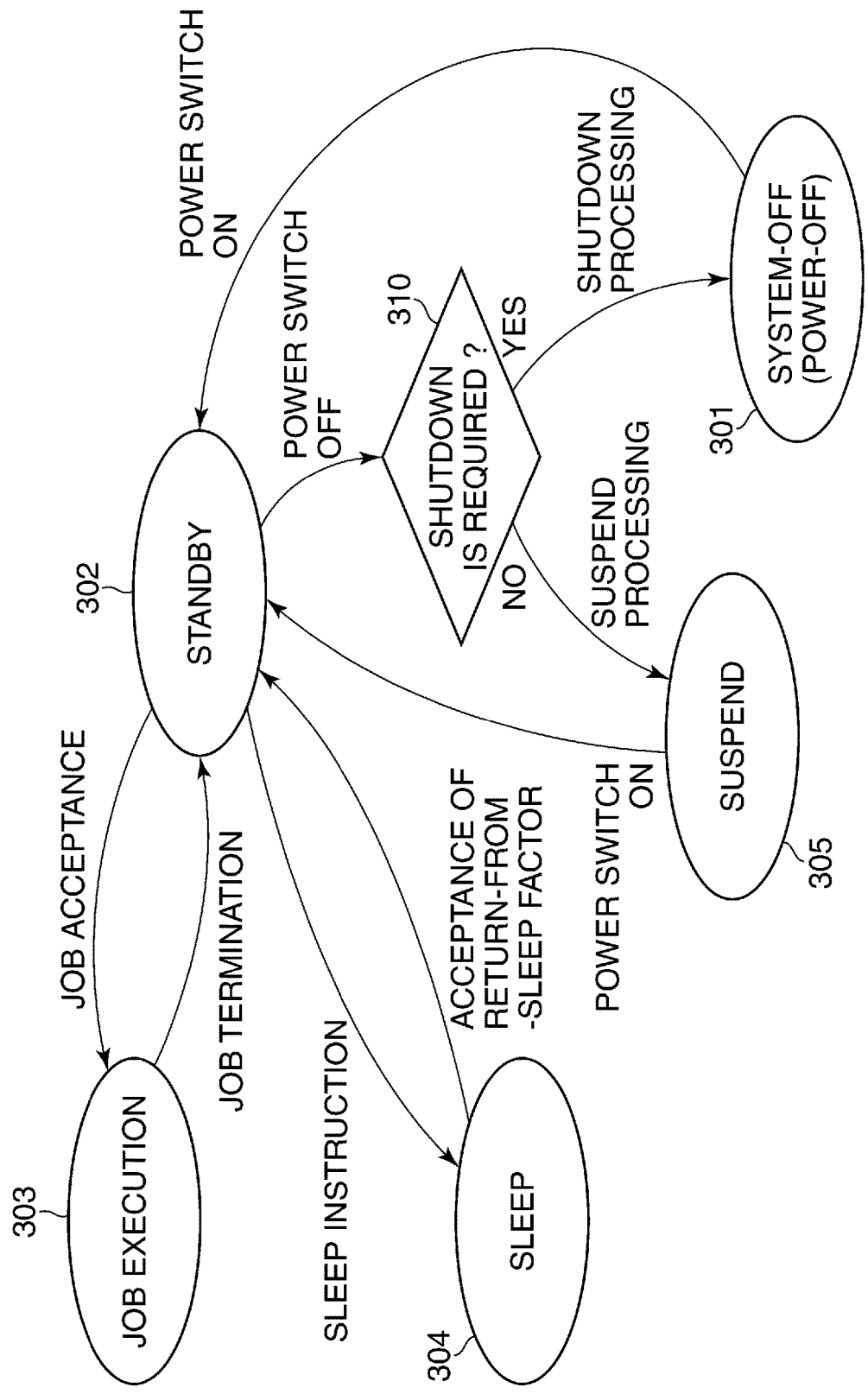
FIG. 8 is a diagram illustrating state shifts of the information processing system according to the present embodiment.

FIG. 8 is a diagram illustrating state shifts of the information processing system 201 as the information processing apparatus according to the present embodiment.

As shown in FIG. 8, the controller 210 is shifted from a de-energized state (system-off state) (301) to a standby state (302) by execution of start processing by a power switch-on operation. In this standby state (302), it is possible to receive a job, such as a copy job or a print job. Note that the information processing system 201 is initialized in the start processing.

The controller 210 having received a job in the standby state (302) shifts to a job execution state (303) to execute associated job processing. When the job is terminated, the controller 210 returns to the standby state (302).

When no operation is performed in the standby state (302) over a predetermined time period, the controller 210 shifts to a sleep state (power saving state) (304). Then, when a return-from-sleep factor, such as a switch operation, network packet reception, or expiration of a timer counting a designated time period, occurs in the sleep state (304), the controller 210 shifts (returns) to the standby state (302).

Further, when the power switch-off operation is performed in the standby state (302), the controller 210 determines whether or not shutdown is required (310). If shutdown is required (YES to 310), the controller 210 executes shutdown processing for a kernel and drivers, thereby shifting to the system-off state (301). On the other hand, if shutdown is not required (NO to 310), the controller 210 executes suspend processing for the kernel and the drivers, thereby shifting to a suspend state (power saving state) (305). Note that the shutdown processing corresponds to termination processing for terminating the information processing system 201. Further, the suspend processing corresponds to deactivation processing for deactivating the operation of the information processing system 201 after storing the state of the information processing system 201 in the DRAM 2213, the HDD 2209, or the flash disk 2208. Note that the term "suspend" in the present embodiment implies not only "suspend" but also "hibernation".

The controller 210 in the suspend state (305) executes resume processing in response to a power switch-on operation, thereby shifting to the standby state (302). The resume processing corresponds to return processing for returning the state of the information processing system 201 to its former state before execution of the suspend processing, using the information stored in the DRAM 2213, the HDD 2209, or the flash disk 2208.

In the following, a description will be given, with reference to FIGS. 9 to 11, of the state shift operation of the information processing system 201 as the information processing apparatus according to the present embodiment.

Figure 9:
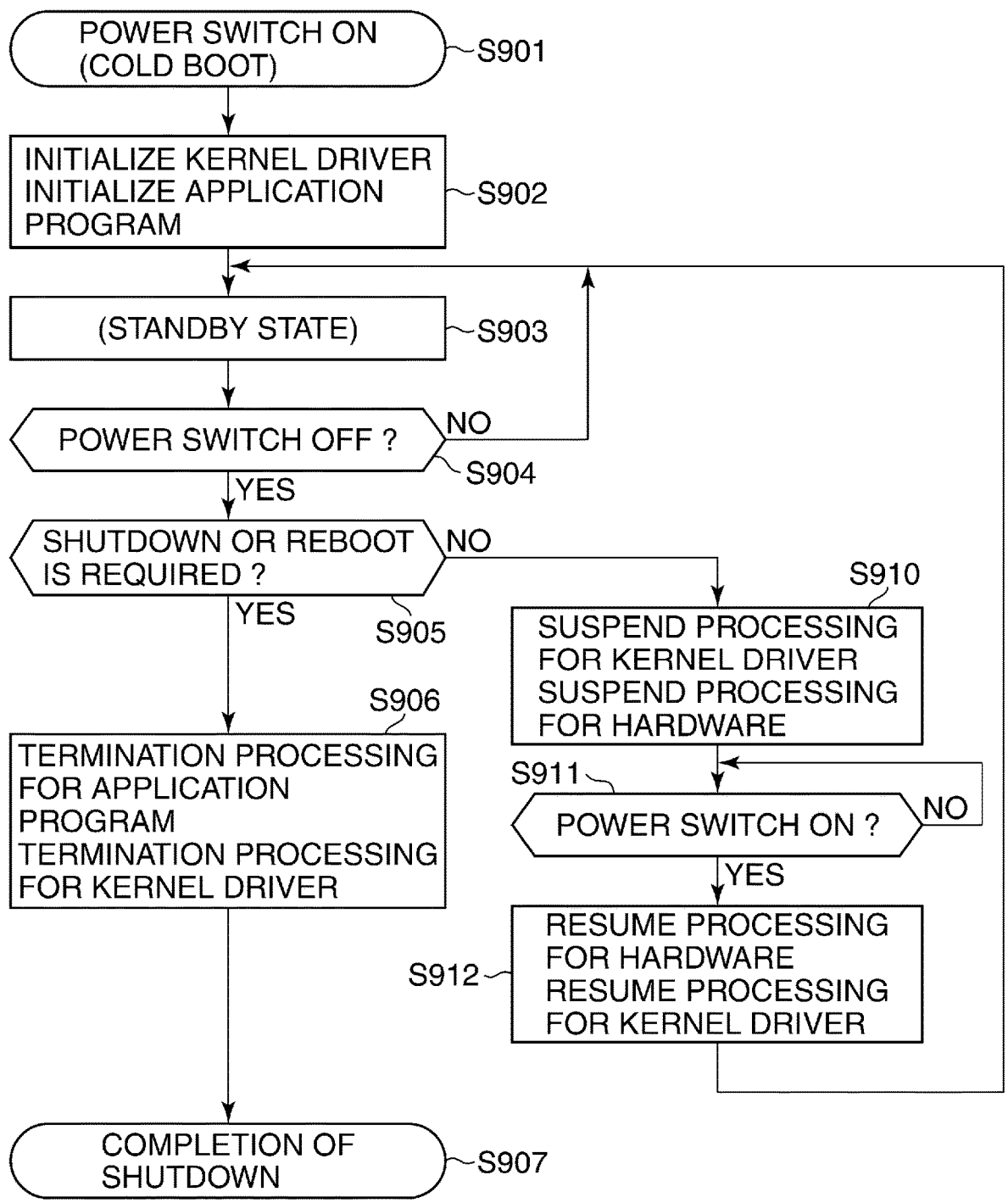
FIG. 9 is a flowchart of a first shift process in which the information processing system in the present embodiment shifts from a standby state to a suspend state.

FIG. 9 is a flowchart of a first shift process in which the information processing system 201 in the present embodiment shifts from the standby state (302) to the suspend state (305) and then returns to the standby state (302). The present process is realized by the CPU 2202 of the controller 210 by executing a program stored in a storage medium (e.g. the boot ROM 2201, the HDD 2209, or the flash disk 2208) in a computer-readable manner.

Upon detecting a power switch-on operation (step S901), the CPU 2202 of the controller 210 initializes the OS kernel and the drivers (step S902). Further, the CPU 2202 starts the information processing system 201 by initializing application programs for various job operations, and then shifts the controller 210 to the standby state (302) (job waiting state) (step S903).

Then, when a power switch-off operation (power-off request) is detected (YES to a step S904), the process proceeds to a step S905.

In the step S905, the CPU 2202 determines, based on a shutdown flag, whether or not shutdown or reboot of the information processing system 201 (i.e. initialization of the OS kernel and the module drivers) is required. Note that the shutdown flag is stored e.g. in the HDD 2209 or the flash disk 2208.

If it is determined in the step S905 that shutdown or reboot is required (i.e. if the shutdown flag is turned ON), the following cases (1) to (3) can be envisaged, for example:

(1) a case where it is desired to start OS kernel update processing;

(2) a case where it is desired to change an OS kernel start mode (normal mode or update mode); and (3) a case where it is desired to execute processing for rebooting a desired module driver (module driver required to be rebooted so as to reflect a change in settings).

For example, let it be assumed that the user operates the console section 207 e.g. in the standby mode (normal mode) to give an instruction for OS update. If this update instruction is detected, the CPU 2202 changes the flag (shutdown flag) indicative of requirement of shutdown to ON, and also sets an update mode start flag to ON. This processing is performed so as to shut down the OS operating in the normal mode and start up the OS by changing the kernel start mode to the update mode (2), and then execute the OS kernel update processing (1). Note that the update mode start flag is stored e.g. in the HDD 2209 or the flash disk 2208.

Further, let it be assumed that the user operates the console section 207 e.g. in the standby mode to change a setting of the network driver (e.g. the setting of the IP address). If this change is detected, the CPU 2202 changes the shutdown flag to ON. This processing is performed so as to reboot the network driver (3) and reflect the changed setting. Furthermore, let it be assumed that the user operates the console section 207 e.g. in the standby mode to update a module driver. If the update of the module driver is detected, the CPU 2202 changes the shutdown flag to ON. This processing is performed so as to reboot the updated module driver (3) and reflect the update. In short, when a specific change (i.e. a change in the network setting, an update of a module driver, which requires initialization of the module driver, or the like) is made in the information processing system 201, the CPU 2202 changes the shutdown flag to ON.

Then, if the power switch is turned off (step S904), the CPU 2202 determines in the step S905 that shutdown or reboot is required if the shutdown flag is on. On the other hand, if the shutdown flag is off, the CPU 2202 determines in the step S905 that neither shutdown nor reboot is required.

If it is determined that shutdown or reboot is required (YES to the step S905), the CPU 2202 executes termination processing for an application program and termination processing for the OS kernel driver (step S906), thereby shutting down the system (completion of system shutdown (step S907)). In other words, the CPU 2202 shifts the controller 210 to the system-off state (301). Thereafter, when the power switch is turned on and if the update mode start flag is on, the CPU 2202 performs control such that the OS is booted in the update mode. In doing this, the OS kernel driver and the application program are initialized.

On the other hand, if it is determined in the step S905 that neither shutdown nor reboot is required (NO to the step S905), the CPU 2202 executes suspend processing for the kernel driver and suspend processing for the hardware (step S910), thereby shifting the controller 210 to the suspend state (power saving state) (305).

If a power switch-on operation is detected in the suspend state (305) (YES to the step S911), the CPU 2202 executes resume processing for the hardware and resume processing for the OS kernel driver (step S912), thereby putting the information processing system 201 into operation. Then, the CPU 2202 shifts the controller 210 to the job waiting state (standby state (302)) (step S903).

Note that the first shift process in FIG. 9 may be replaced by a variation thereof described below with reference to FIG. 10.

Figure 10:
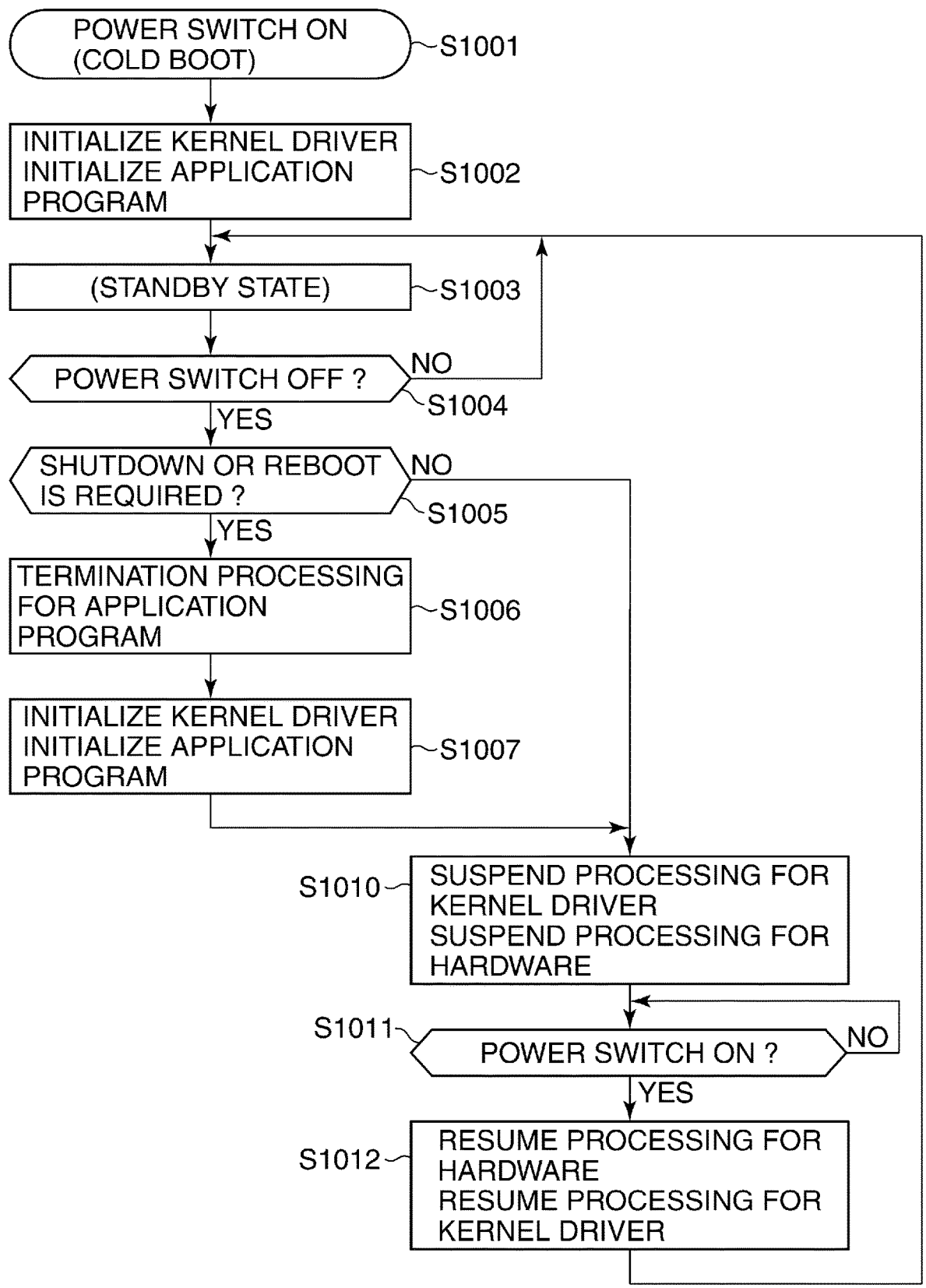
FIG. 10 is a flowchart of a variation of the first shift process in which the information processing system in the present embodiment shifts from the standby state to the suspend state.

FIG. 10 is a flowchart of the variation of the first shift process in which the information processing system 201 as the information processing apparatus according to the present embodiment is rebooted once from the standby state (302), shifts to the suspend state 305, and then shifts to the standby state (302) again. The present process is realized by the CPU 2202 of the controller 210 by executing a program stored in a storage medium (e.g. the boot ROM 2201, the HDD 2209, or the flash disk 2208) in a computer-readable manner.

When a power switch-on operation is detected (step S1001), the CPU 2202 of the controller 210 initializes the OS kernel and the drivers (step S1002). Further, the CPU 2202 initializes application programs for various job operations, thereby putting the information processing system 201 into operation, and shifts the controller 210 to the standby state (302) (job waiting state) (step S1003).

Then, when a power switch-off operation (power-off request) is detected (YES to a step S1004), the process proceeds to a step S1005. In the step S1005, the CPU 2202 determines, based on the above-mentioned shutdown flag, whether or not shutdown or reboot of the information processing system 201 (i.e. initialization of the OS kernel and the module drivers) is required. Cases in which it is determined in the step S1005 that shutdown or reboot of the information processing system 201 is required (i.e. when the shutdown flag is turned on) are as described hereinbefore with reference to FIG. 9.

If it is determined in the step S1005 that shutdown or reboot is required (YES to the step S1005), the CPU 2202 executes termination processing for an application program and termination processing for the OS kernel driver (step S1006). Further, the CPU 2202 reinitializes the OS kernel driver and the application program as well (step S1007). In other words, the system is rebooted. In the case of rebooting the OS, if the above-mentioned update mode start flag is on, the CPU 2202 performs control such that the OS is booted in the update mode.

Then, after the information processing system 201 has shifted to the normal state (the standby state (302)), the CPU 2202 executes suspend processing for the kernel driver and suspend processing for the hardware (step S1010), thereby shifting the controller 210 to the suspend state (305). If a power switch-on operation is detected in the suspend state (305) (YES to the step S1011), the CPU 2202 executes resume processing for the hardware and resume processing for the OS kernel driver (step S1012), thereby putting the information processing system 201 into operation. Then, the CPU 2202 shifts the controller 210 to the job waiting state (standby state (302)) (step S1003).

On the other hand, if it is determined in the step S1005 that neither shutdown nor reboot is required (NO to the step S1005), the CPU 2202 immediately executes the steps S1010 to S1012, thereby putting the information processing system 201 into operation. Then, the CPU 2202 shifts the controller 210 to the job waiting state (standby state (302)) (step S1003).

In the variation in FIG. 10, processing executed in a case where reboot is required takes more time than in the first shift process in FIG. 9. However, when the user turns on the power next time, the information processing system returns from the suspend state, so that it is possible to start the system at higher speed than in the FIG. 9 first shift process in which the system is started from the power-off state.

Next, a description will be given, with reference to FIG. 11, of a second shift process in which the information processing system 201 as the information processing apparatus according to the present embodiment shifts from the sleep state (304) to the suspend state (305) and then returns to the sleep state (304).

FIG. 11 is a flowchart of the second shift process in which the information processing system 201 as the information processing apparatus according to the present embodiment shifts from the sleep state (304) to the suspend state (305) and then shifts to the sleep state (304) again. The present process is realized by the CPU 2202 of the controller 210 by executing a program stored in a storage medium (e.g. the boot ROM 2201, the HDD 2209, or the flash disk 2208) in a computer-readable manner.

When a power switch-on operation is detected (step S1101), the CPU 2202 of the controller 210 initializes the OS kernel and the drivers (step S1102). Further, the CPU 2202 initializes application programs for various job operations, thereby putting the information processing system 201 into operation, and then shifts the controller 210 to the standby state (302). Then, as described with reference to FIG. 8, if no operation is detected over a predetermined time period, the CPU 2202 executes sleep processing, thereby shifting the controller 210 to the sleep state (304) (step S1103).

Then, when a power switch-off operation (power-off request) is detected (YES to a step S1104), the CPU 2202 executes return-from-sleep processing (step S1105), thereby returning the controller 210 from the sleep state (304) so as to once shift the same to the standby state (302). After having shifted the controller 210 to the standby state (302), the CPU 2202 determines, based on the shutdown flag, whether or not shutdown or reboot of the information processing system 201 (i.e. initialization of the OS kernel and the module drivers) is required (step S1106). Cases in which it is determined in the step S1106 that shutdown or reboot of the information processing system 201 is required (i.e. when the shutdown flag is turned on) are as described hereinbefore with reference to FIG. 9.

If it is determined that shutdown or reboot is required (YES to the step S1106), the CPU 2202 executes termination processing for an application program and termination processing for the OS kernel driver (step S1107), thereby shutting down the system (completion of system shutdown (step S1108). In other words, the CPU 2202 shifts the controller 210 to the system-off state (301). Thereafter, when the power switch is turned on and if the update mode start flag is on, the CPU 2202 performs control such that the OS is booted in the update mode.

On the other hand, if it is determined in the step S1106 that neither shutdown nor reboot is required (NO to the step S1106), the CPU 2202 executes suspend processing for the kernel driver and suspend processing for the hardware (step S1110), thereby shifting the controller 210 to the suspend state (power saving state) (305).

If a power switch-on operation is detected in the suspend state (305) (YES to the step S1111), the CPU 2202 executes resume processing for the hardware and resume processing for the OS kernel driver (step S1112), thereby putting the information processing system 201 into operation. Then, the CPU 2202 shifts the controller 210 to the job waiting state (standby state (302)). Then, if no operation is detected over the predetermined time period, the CPU 2202 executes sleep processing, thereby shifting the controller 210 to the sleep state (304) (step S1103).

Figure 12A:
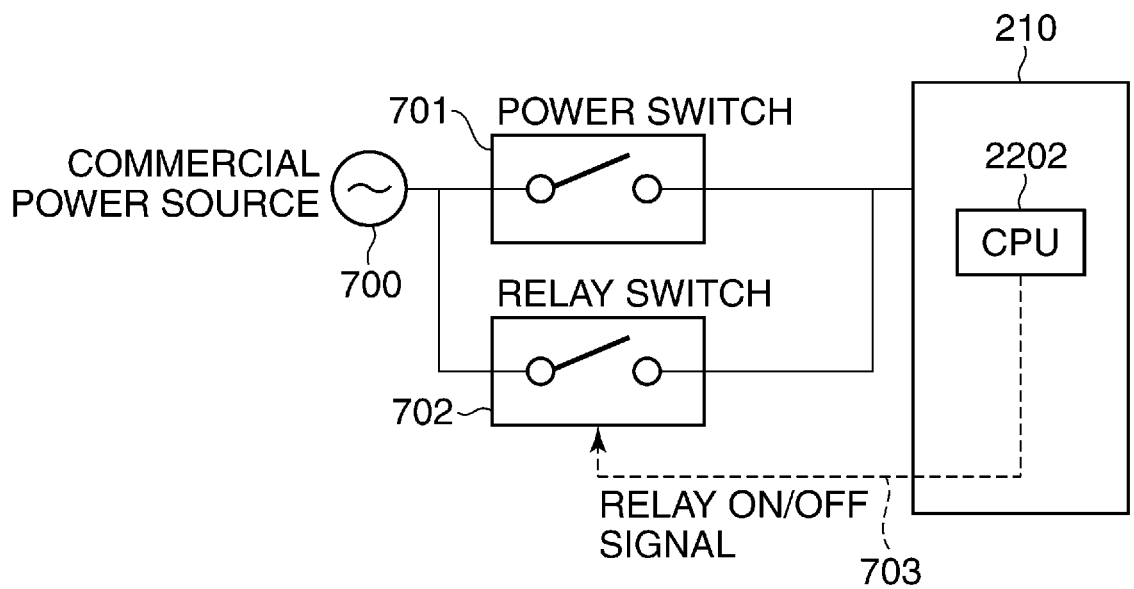
FIGS. 12A and 12B are block diagrams of an example of the power supply arrangement of the information processing system.
Figure 12B:
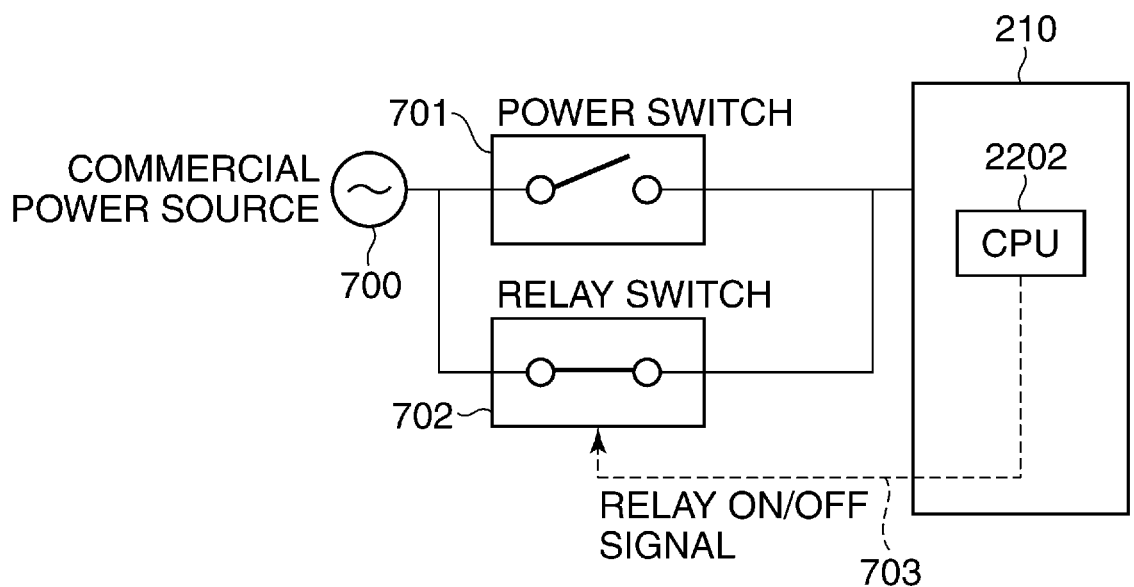

In the following, a description will be given, with reference to FIGS. 12A and 12B, of the power supply arrangement of the information processing system 201. FIGS. 12A and 12B are block diagrams showing an example of the power supply arrangement of the information processing system 201.

Referring to FIGS. 12A and 12B, a reference numeral 700 denotes a commercial power source, 701 a power switch, and 702 a relay switch. The relay switch 702 is disposed in parallel with the power switch 701 so as to enable supply of electric power from the commercial power source 700 even after the power switch 701 is turned off. Note that the CPU 2202 of the controller 210 is capable of performing on/off control of the relay switch 702 by a relay on/off signal 703.

As described hereinabove, when the user turns off the power switch 701, the CPU 2202 of the controller 210 determines whether or not shutdown is required. If shutdown is required, the CPU 2202 shuts down the information processing system and shifts the controller 210 to the system-off state. On the other hand, if shutdown is not required, the CPU 2202 executes suspend processing to thereby shift the controller 210 to the suspend state.

In the case of performing shutdown, the CPU 2202 of the controller 210 brings the relay switch 702 into an off state, as shown in FIG. 12A, to thereby cut off the supply of electric power to the controller 210 from the commercial power source 700.

On the other hand, in the case of performing suspend processing, the CPU 2202 of the controller 210 holds the relay switch 702 in an on state, as shown in FIG. 12B, to thereby maintain the supply of electric power to the controller 210 from the commercial power source 700. This makes it possible to maintain the supply of electric power to some units including the DRAM 2242. Thus, when the power switch 701 is turned on in the suspend state, it is possible to read out data e.g. from the DRAM 2242 at high speed to thereby speed up the start-up of the information processing system 201.

As described above, according to the present embodiment, it is possible to selectively use suspend processing (or hibernation processing) and shutdown processing in an appropriate manner without making a user who performed a power-off operation aware of it, to thereby achieve appropriate initialization, quick start, and excellent usability of the information processing system.

In other words, when the user performs normal power-off operation without caring about the difference between deactivation processing (suspend or hibernation processing) and shutdown processing, the system automatically determines whether to perform deactivation processing or shutdown processing and appropriately carries out one of them. This makes it possible to achieve appropriate initialization, quick start, and excellent usability of the information processing system.

Note that the present invention is not limited to the above-described embodiments, but it can be practiced in various forms. For example, the present invention can be applied to a system, an apparatus, a method, a program, a storage medium, and so forth. Specifically, the present invention may be applied to a system formed by a plurality of devices or to an apparatus formed as a single device.

Further, the present invention includes a combination of the above-described embodiments.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-288047 filed Dec. 24, 2010, Japanese Patent Application No. 2010-280091, filed Dec. 16, 2010 which are hereby incorporated by reference herein in their entirety.

What is claimed is:

1. A printing apparatus of which power states include a standby state, a sleep state at which the printing apparatus is less in power consumption than the standby state, a first turned off state at which the printing apparatus is less in power consumption than the sleep state, and a second turned off state at which the printing apparatus is less in power consumption than the first turned off state, the printing apparatus comprising:
- a switch that receives a user operation for turning off the printing apparatus;
- a processor that executes instructions stored in a memory; and
- a power controller that shifts a power state of the printing apparatus to the sleep state, and shifts the power state of the printing apparatus to the standby state temporarily when the switch receives the user operation for turning off the printing apparatus during the sleep state, wherein the processor refers to a setting after having shifted to the standby state,
- wherein the power controller shifts the power state of the printing apparatus to the first turned off state or the second turned off state from the standby state in accordance with the setting referred to by the processor.

2. The printing apparatus according to claim 1, wherein the printing apparatus comprises a printing section.

3. The printing apparatus according to claim 1, wherein the first turned off state is an S3 state of ACPI (Advanced Configuration and Power interface) and the second turned off state is an S5 state of ACPI.

4. The printing apparatus according to claim 1, wherein the processor refers the setting after having shifted to the standby state and determines a power state to which the printing apparatus is to be shifted.

5. The printing apparatus according to claim 1, wherein, before the power state of the printing apparatus is shifted to the first turned off state, the processor executes termination processing for a kernel driver.

6. The printing apparatus according to claim 1, wherein, before the power state of the printing apparatus is shifted to the second turned off state, the processor executes suspend processing for a kernel driver.

7. The printing apparatus according to claim 1, wherein, before the power state of the printing apparatus is shifted to the first turned off state, the processor executes termination processing for an application program.

8. The printing apparatus according to claim 1, wherein, before the power state of the printing apparatus is shifted to the second turned off state, the processor executes suspend processing for hardware.

9. The printing apparatus according to claim 1, wherein the first turned off state is a suspend state.

10. The printing apparatus according to claim 1, wherein the second turned off state is a shutdown state.

11. The printing apparatus according to claim 1, wherein the setting is a shutdown flag.

12. A method for controlling an printing apparatus, including a switch that receives a user operation for turning off the printing apparatus, and of which power states include a standby state, a sleep state at which the printing apparatus is less in power consumption than the standby state, a first turned off state at which the printing apparatus is less in power consumption than the sleep state, and a second turned off state at which the printing apparatus is less in power consumption than the first turned off state, the method comprising:
- controlling to shift a power state of the printing apparatus to the sleep state, and shift the power state of the printing apparatus to the standby state temporarily when the switch receives the user operation for turning off the printing apparatus during the sleep state, wherein a setting is referred to after having shifted to the standby state; and
- controlling to shift the power state of the printing apparatus to the first turned off state or the second turned off state from the standby state in accordance with the setting.

13. A non-transitory computer-readable storage medium storing a program configured to, when executed by a computer, cause the computer to perform a method for controlling a printing apparatus, including a switch that receives a user operation for turning off the printing apparatus, and of which power states include a standby state, a sleep state at which the printing apparatus is less in power consumption than the standby state, a first turned off state at which the printing apparatus is less in power consumption than the sleep state, and a second turned off state at which the printing apparatus is less in power consumption than the first turned off state, the method comprising:
- controlling to shift a power state of the printing apparatus to the sleep state, and shift the power state of the printing apparatus to the standby state temporarily when the switch receives the user operation for turning off the printing apparatus during the sleep state, wherein a setting is referred to after having shifted to the standby state; and
- controlling to shift the power state of the printing apparatus to the first turned off state or the second turned off state from the standby state in accordance with the setting.

* * * * *